(12) United States Patent
Shah et al.

(10) Patent No.: US 9,779,066 B2
(45) Date of Patent: Oct. 3, 2017

(54) METHOD AND SYSTEM FOR CONVERTING PUNYCODE TEXT TO ASCII/UNICODE TEXT

(71) Applicant: Umm Al-Qura University, Makkah (SA)

(72) Inventors: Noman Ahmed Shah, Makkah (SA); Imran Ahmed Shah, Lahore (PK); Kamran Ahmed Shah, Leeds (GB)

(73) Assignee: Umm Al-Qura University, Makkah (SA)

( * ) Notice: Subject to any disclaimer, the term of this patent is extended or adjusted under 35 U.S.C. 154(b) by 111 days.

(21) Appl. No.: 14/718,383

(22) Filed: May 21, 2015

(65) Prior Publication Data
US 2016/0342838 A1    Nov. 24, 2016

(51) Int. Cl.
| G06K 9/00 | (2006.01) |
| --- | --- |
| G06F 17/21 | (2006.01) |
| G06K 9/68 | (2006.01) |
| G06F 17/22 | (2006.01) |

(52) U.S. Cl.
CPC ......... *G06F 17/22* (2013.01); *G06K 2209/01* (2013.01)

(58) Field of Classification Search
CPC ........ G06K 9/20; G06K 9/2009; G06K 9/033; G06K 19/06037; G06K 9/00664–9/00704; H04N 1/193; H04N 5/272; G06F 3/0481; G06F 3/04817; G06F 9/4443; G06F 3/04847; G06F 11/3664; G06T 19/00; G06T 17/00; G06T 19/006; A63F 13/10
See application file for complete search history.

(56) References Cited

U.S. PATENT DOCUMENTS

| 7,603,482 B2 | 10/2009 | Horton et al. |
| 8,572,566 B2 | 10/2013 | Gass et al. |
| 8,719,355 B2 | 5/2014 | Bayles |
| 8,756,286 B2 | 6/2014 | Bayles et al. |
| 2014/0100845 A1* | 4/2014 | Hoskinson .......... H04L 61/3035 704/8 |
| 2014/0337345 A1* | 11/2014 | Motoyama ............ G06F 3/0604 707/738 |
| 2015/0278188 A1* | 10/2015 | Aras ..................... G06F 17/271 709/245 |

FOREIGN PATENT DOCUMENTS

| KR | 1006853 | * | 1/2011 |
| WO | 2007139552 A1 | | 12/2007 |

OTHER PUBLICATIONS

Costello, A., Punycode: A Bootstring encoding of Unicode for Internationalized Domain Names in Applications (IDNA), Network Working Group, Standards Track, University of California, Berkeley, Mar. 2003, pp. 1-36, retrieved from http://tools.ietf.org/html/rfc3492.

\* cited by examiner

*Primary Examiner* — Todd Buttram
(74) *Attorney, Agent, or Firm* — Hauptman Ham, LLP

(57) ABSTRACT

A method for converting Punycode text to Unicode text with augmented reality includes the steps of providing a client device, a computer, a scanner, optical code recognition software, Punycode/ASCII and/or Unicode dictionary tables and further a Punycode text. The Punycode text is scanned and saved in the computer and the scanned image is subjected to the optical code recognition software to identify Punycode strings. Those strings are then converted and segregated into Unicode strings.

22 Claims, 4 Drawing Sheets

METHOD AND SYSTEM FOR CONVERTING PUNYCODE TEXT TO ASCII/UNICODE TEXT

FIELD OF THE INVENTION

This invention relates to a method and system for converting Punycode text to ASCII/Unicode text and more particularly to a method and system for converting Punycode text to ASCII/Unicode text with augmented reality.

BACKGROUND FOR THE INVENTION

Punycode is an encoding system by which a Unicode string of characters can be translated into the basic ASCII-characters permitted in network host names. Punycode is used for internationalized domain names in short IDN or IDNA (international domain names in applications).

Augmented reality as defined in Wikipedia is a live direct or indirect view of a physical real world environment whose elements are augmented (or supplemented) by a computer generated input.

A U.S. Pat. No. 7,603,482 of Horton et al. discloses a DNS Compatible PNRP Peer Name Encoding. The patent discloses a method of converting a peer name to PNRP DNS. The method may take a peer name and encode it into a common DNS name or a PNRP DNS name and convert it into a peer name.

A final U.S. Pat. No. 8,756,286 of Bayles et al. is directed to an Alternate E-Mail Address Configuration. As disclosed, a method is provided for transmitting an electronic mail (e-mail) message from a sender having a non-ASCII e-mail address to a recipient. Provided is an e-mail directory associated with a requested primary e-mail address, having a non-ASCII form, and a corresponding alternate e-mail address having an ASCII form. The alternate e-mail is generated from the primary e-mail address using a reversible encoding scheme having a one-to-one relationship. The e-mail message, the alternate e-mail address, and the primary e-mail address are transmitted to the recipient via a plurality of mail delivery elements. The alternate e-mail address is transmitted to a mail delivery element incapable of processing non-ASCII characters. The alternate e-mail address is for use by the mail delivery element to identify the sender and deliver the e-mail message to the recipient for display.

BRIEF SUMMARY OF THE INVENTION

A method for converting Punycode text to Unicode text with augmented reality contemplates the steps of providing a client device, a computer, a scanner, optical code recognition software, Punycode/ASCII and/or Unicode dictionary tables and Punycode text. In the following steps, the Punycode text is scanned and saved in the computer and the scanned image is subjected to the optical code recognition software to identify Punycode strings. The Punycode strings are then converted and segregated into Unicode strings and thereafter the Unicode strings included e-mail addresses are displayed on the client device in Unicode and/or ASCII code alpha numeric character sets and wherein the optical character recognition software converts the optical image of characters into decoded data and generates corresponding alpha numeric character and symbol for each recognized character.

The invention will now be described in connection with the accompanying drawings.

DETAILED DESCRIPTION OF THE PREFERRED EMBODIMENTS OF THE INVENTION

Figure 1:
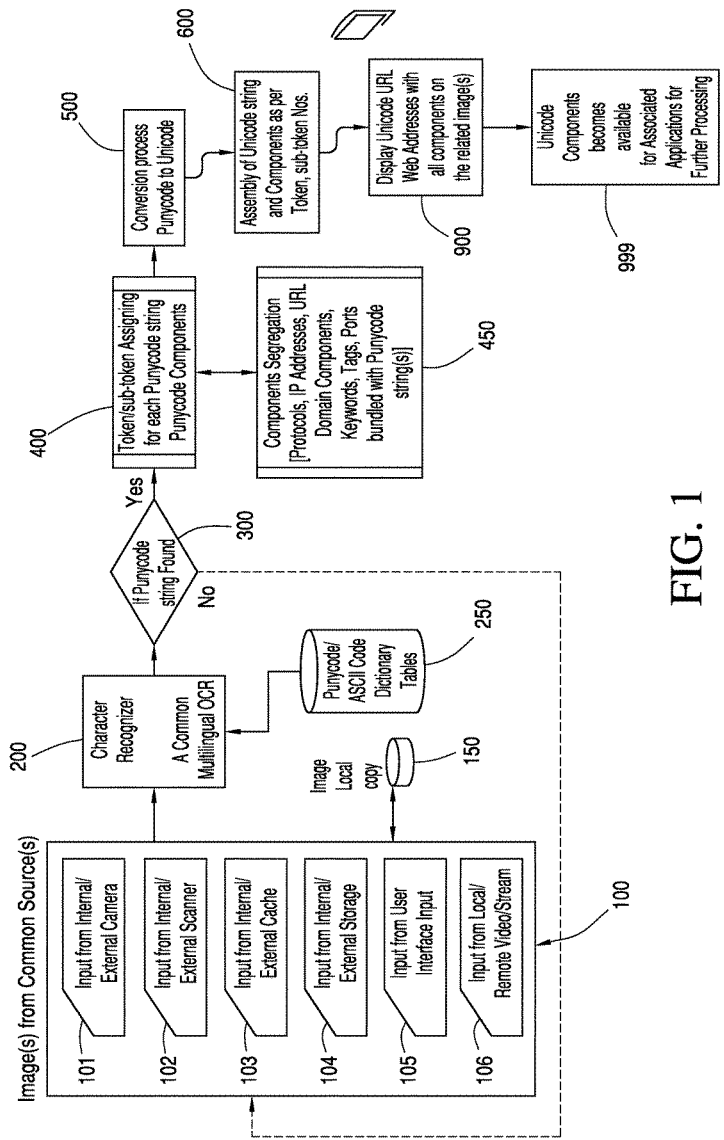
FIG. 1 is a diagrammatic illustration of a method for converting Punycode text to Unicode text with augmented reality in accordance with a first embodiment of the invention.

As illustrated in FIG. 1, a first embodiment of the invention illustrates a computer-related system, and/or method as well as apparatus including computer program and products operable to perform operations including a number of common functions.

To be more specific, taking image(s) or snapshot(s) or photo(s) or frame(s) of video(s) 100 in a real time environment from any of the available source(s) of the apparatus or device, whereas the well-known available media or source(s) could be as input or as retrieval from internal or external, and accessible from remote or local source(s) and these source(s); including camera interface 101 and/or image scanning interface 102 and/or temporary Memory/Cache 103 and/or permanent memory storage 104 and/or or user input interface 105 and/or frame(s) of Local or Remote Video Stream 106. A local copy of the image/snapshot/photo/frame is also saved internally as reference 150.

If the real-time image is being viewed or taken from any interface such as from scanning interface or digitizer or camera interface, the auto-focus procedure may be initiated for device dependent functionality including adjustment to aperture, zoom, brightness, sharpness or resolution supporting to arrange properly focused real time image for better readability and accuracy.

Recognizing the characters through OCR 200, the textual elements recognizable as text conforming to, for instance, Punycode, ASCII Code or Unicode alpha numeric characters set(s) and symbol(s), these characters and/or textual elements may be related to different languages (multilingual text), however, as per the required scope of textual objects to be abstracted and in order to increase the performance and accuracy of the OCR results, the OCR functionality may be improved by limiting its scope to the dictionary tables 250 only related to Punycode and ASCII Code alpha numeric characters set(s) and symbol(s).

The optical character recognizer 200 converts the optical images of characters into encoded data by recognizing the characters in the character string information and generating a corresponding encoded data alpha numeric characters and symbols for each recognized character, textual elements/manuscript. In one embodiment, the character recognizer is embodied as optical character recognition (OCR) software. OCR software is well known in the field and a detailed description of OCR software is beyond the scope of this disclosure and not necessary for the understanding of the subject invention. However, it should be understood that, in general, OCR software functions to convert bitmap image data corresponding to a document having text into encoded data corresponding to the text by using, for instance, a thresh holding technique on the bitmap data.

Once Punycode string(s) (URL Domain Name/Web Addresses) are identified in expression 300, disclosed system initiates further processing that includes:

Tokens and Sub-Tokens are Assigned 400 to each Punycode string (used for URL Domain Name/Web Address) and Segregated components after components segregation process 450.

Conversion Process Converts Punycode strings (used for URL Domain Name/Web Address) and segregated components to Unicode String 500.

After conversion of segregated components into Unicode string components [standard protocol, sub-sub-domain, sub-domain, top level domain (TLD), sub folders and page addresses, page extension, keywords and parameters passing through it, port(s) and IP addresses], are then reassembled (in process 600).

Display on the same image corresponding to the each Punycode string as augmented reality, as well as makes these components available in combination and separately for further processing.

Unicode String(s) (along with Unicode components) is output is returned and display 900 on client device, on the same image, corresponding to the each Punycode string as augmented reality.

In addition to this, the applicant(s) also claims herein that the present system also makes these 'Unicode String(s) and components' available in combination and separately for further processing through other internal and/or external associated applications of the same device and/or directly attached computers device(s) and/or remotely connected computer devices.

Because complete process does not involve human interaction/input or selection that is why the process completes its cycle in real-time environment and response immediately with augmented reality representation.

The system provides easy, efficient and simple user interface for the ease of a common and global Internet user, and may also be enhanced in its embodiments to support multilingual interface features (in native language of the user), as the output of the present invention is already Unicode (that mean multilingual encoding support).

Figure 2:
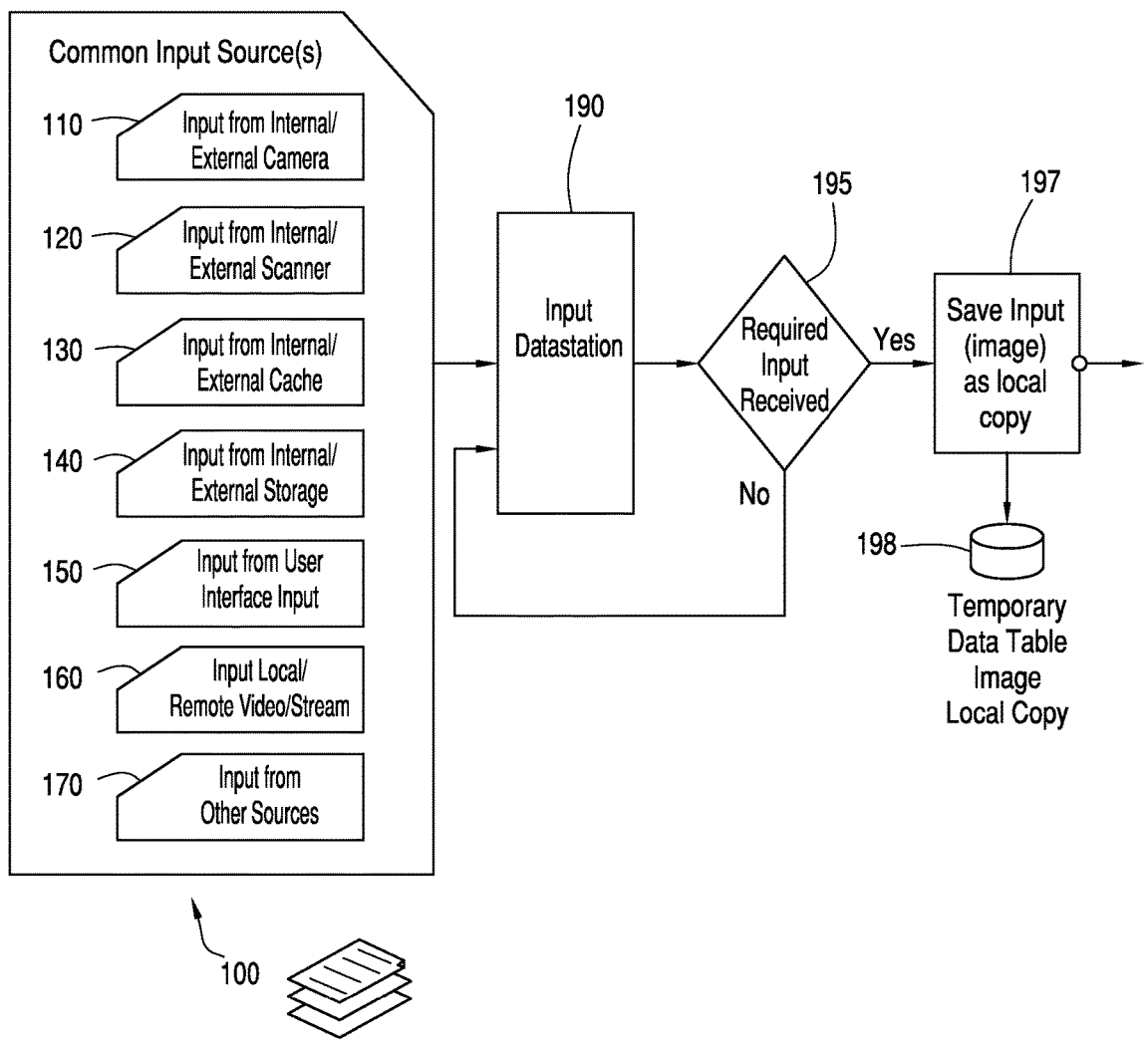
FIG. 2 is a diagrammatic illustration illustrating a source of inputs and input detector and the initial steps in a procedure in accordance with a second embodiment of the invention.
Figure 3:
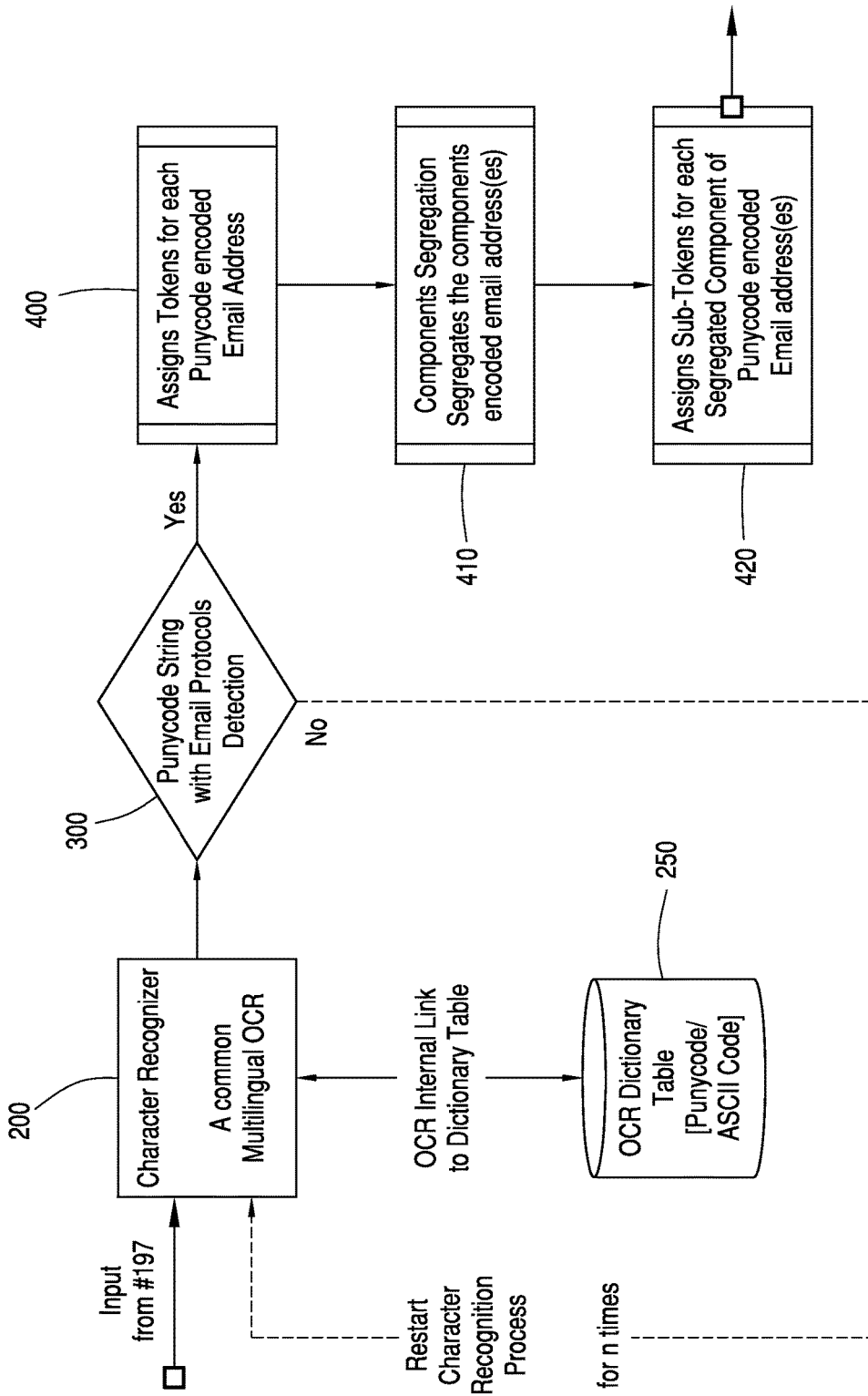
FIG. 3 is a diagrammatic illustration of a second portion of the method in accordance with the second embodiment of the invention.
Figure 4:
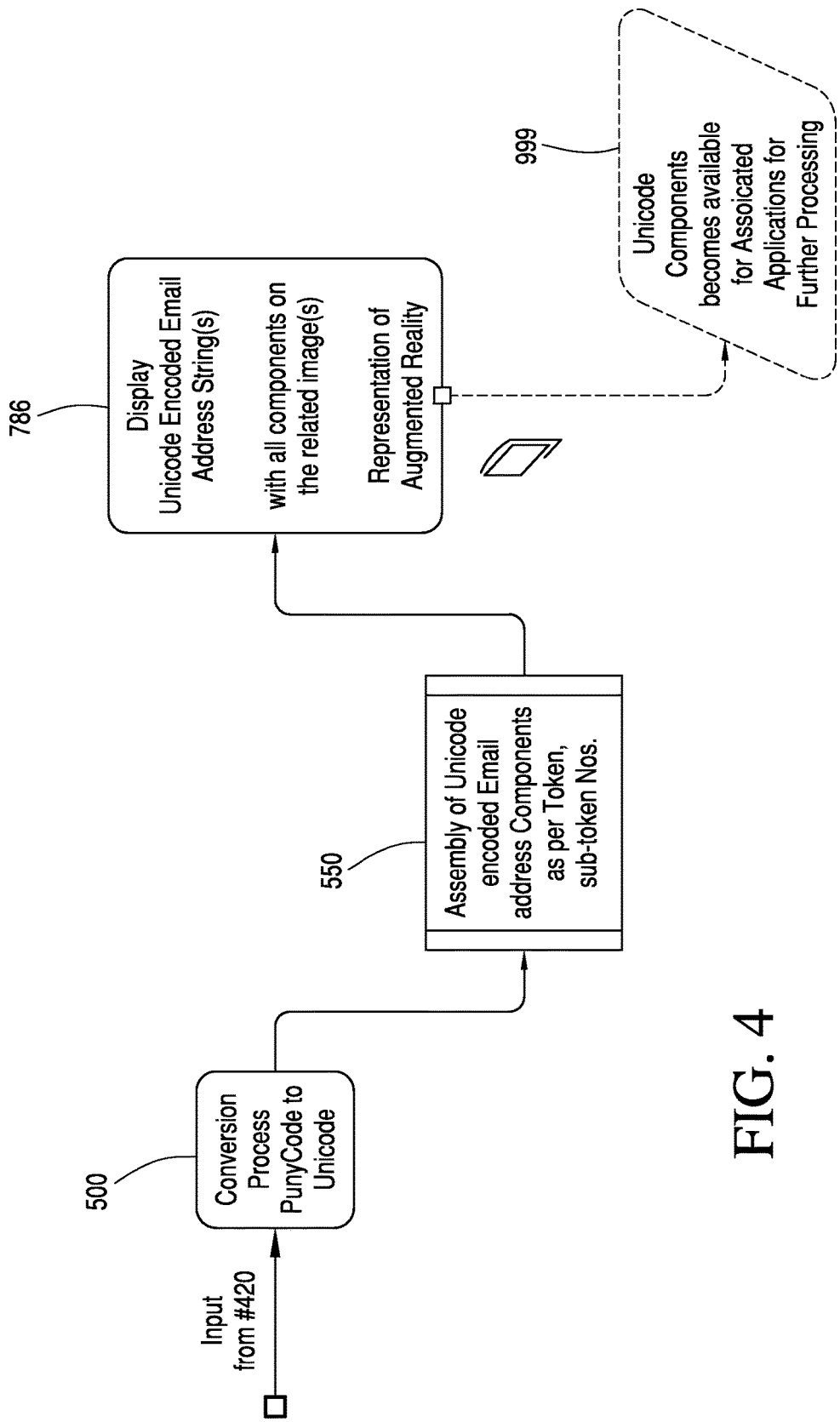
FIG. 4 is a diagrammatic illustration of a third portion of the invention in accordance with the second and third embodiments of the invention.

Further embodiments of the invention, are illustrated in FIGS. 2, 3 and 4 hereof.

Taking image(s) or snapshot(s) or photo(s) or frame(s) of video(s) 100 in a real time environment from any of the available source(s) of the apparatus or device, whereas the well-known available media or source(s) could be as input or as retrieval from internal or external, and accessible from remote source(s) and/or local source(s); including camera interface 110 and/or image scanning interface 120 and/or temporary Memory/Cache 130 and/or permanent memory storage 140 and/or or user input interface 150 and/or frame(s) of local or remote Video Stream 160.

When disclosed system is activated, Input Listener 190 is also invoked and starts listening input from common input resource(s) 100.

If the real-time image is being viewed or taken from any interface such as from scanning interface or digitizer or camera interface, the auto-focus procedure may be initiated for device dependent functionality including adjustment to aperture, zoom, brightness, sharpness or resolution supporting to arrange properly focused real time image for better readability and accuracy and this operational support activity is interlinked with an input device namely the input listener 190.

There are two types of detection. A first detection is at the initial stage and is referred as "input listener", here the system is detecting the method of getting data/object input through available source(s) which may be any input device or internal/external local/remote camera/image scanning interface/device internal/external memory storage and could be an image(s) or frames. For instance if the system is active and has detected that a live view of some object (most probably related to the script) is being taken through internal camera of the device, the output will is being viewed on the display, at this stage if, continuous listening process is detecting/understanding the input source and the image(s) (or frames of the Video) is being supplied to the next step.

Second detection is being scrutinized in immediate next step where the type of image (image or frames of the video), its quality, the contents of the image (either having consisting and text or only bitmap objects) are being assessed, and once the image having reasonable quality (pass minimum threshold values) and also having some text elements in the image/frame, the input image/frame will be saved (as local copy) otherwise, the image(s)/frame(s) will be rejected and a caution will be returned to the input listener process to take next image/frame, if the rejection frequency is high, the system will also initiate camera related functions at real time for making the image better for readability and accuracy.

If any input is received to input listener 190, it is immediately reviewed by filtration inspector 195 for some standard parameters including input type(s), quality, visibility, plain or filled with objects and if the quality of input image does not meet minimum thresh hold, input is rejected and process input listener 190 is intimated, otherwise, if successfully passed, the input is forwarded to next process 200.

Punycode strings labels are some mapping arrangements of non-ASCII code or Unicode domain names. Punycode is being used for Internationalized Domain Names (IDN), whereas the Internationalized Domain Names (IDN) may consist of non-ASCII characters according to the language table. A complete web address, and email address or ftp name address also have different components and few of them are ASCII Codes. Punycode strings labels segment of IDN URL is domain name which is delimited by dots. Dots also segregate the Top Level Domain Name, Second Level domain name, Third Level Domain Name and/or sub domain name, email address has further segregation of its components delimited by "@" symbol and also having Email User ID. In the disclosed invention it is stated that the Punycode string is assigned a token, this token will be used to address the complete Punycode strings labels and will also help in pointing/referring more than one Punycode strings labels (if found on the said image taken for processing). In next step the components of each Punycode strings labels are segregated in to separate components and each component is assigned with a sub token (a branch of the token), and each segregated component is processed through conversion processes to convert into ASCII Code, now these ASCII Code components has to be re-joined in the same sequence in which these were segregated. Sub Token will be helping in re-joining process. And then the converted string will also be related with the main Token. The further utilization of the token and sub token is separate in all three cases, Web Address String, Email Address String and FTP address String of Punycode labels. For example in Email Address, the list of Email User ID (prefix portion of the email address) and Domain Name (suffix portion of the email address) may be recorded or automatically listed as per need.

A local copy of the image/snapshot/photo/frame is also saved internally for reference (and future use) in process 197.

Recognizing the characters through OCR 200, the textual elements recognizable as text conforming to, for instance, Punycode, ASCII Code or Unicode alpha numeric characters set(s), hyphen and symbol(s), these characters and/or textual elements may be related to different languages (multilingual text), however, as per the required scope concerning textual elements, the objective of 200 is to find and abstract those email addresses which are encoded in Punycode notation with increased performance and accuracy of the OCR results, the OCR functionality may be improved by limiting its scope to the dictionary tables 250 that only relates to Punycode and ASCII Code alpha numeric characters set(s) and symbol(s).

The system for scanning and converting Punycode text to Unicode text with augmented reality in which the conversion converts Punycode strings and segregated components to Unicode strings is also being arranged to encounter any URL spoofing attacks containing non-ASCII characters. This process is also helping to protect users against the risk of homograph-spoofing attacks. And the system will not allow intermixing of scripts for a given Punycode labels while processing. A Punycode label "xn--mgb9awbcd.xn--mgbz20b" is a domain name where as "xn--" is always used as prefix to any Punycode label and will not be translated, xn--mgb9awbcd is domain name to Top Level Domain of an Internationalized Domain Name (IDN) xn--mgbz20b, xn--mgb9awbcd will be translated.

The optical character recognizer 200 converts the optical images of characters into encoded data by recognizing the characters in the character string information and generating a corresponding encoded data alpha numeric characters and symbols for each recognized character, textual elements/manuscript. In one embodiment, the character recognizer is embodied as optical character recognition (OCR) software. OCR software is well known in the field and a detailed description of OCR software is beyond the scope of this disclosure and not necessary for the understanding of the subject invention. However, it should be understood that, in general, OCR software functions to convert bitmap image data corresponding to a document having text into encoded data corresponding to the text by using, for instance, a thresh holding technique on the bitmap data.

Once at least one (or more) Punycode encoded Email Address(es) is (/are) found in Punycode String with Email Protocols Detection process 300, the disclosed system performs main processing that includes:

Sub domain and Sub Subdomain are used to elaborate the next level domain names. For example https://tools.ietf.org/html/rfc3492.txt, here .ORG is a Top Level Domain Name (TLD), .ietf.org elaborate that is .ietf is a main domain name with .ORG and in string tools.ietf.org tools is a sub domain of domain ietf.org and there could be some further next level hierarchy such as idna.tools.ietf.org, whereas the idna may be explained as sub sub domain name. Whereas the rfc3492.txt is a webpage and there could be different types of the webpages in html format page could have a name like aboutus.html, whereas the .txt or .html is page extensions. One more example of url address http://www.w3schools.com/vbscript/showasp.asp?filename=demo_vb_date_func may be used to explain sub-folder and keywords/parameters. In this given example, . . . /vbscript/ . . . is a sub-folder (a next level directory in the main hosting directory), and from where an active server page namely showasp.asp is being accessed for some query function where the keyword "filename" is given parameter values demo_vb_date_func. In Punycode labels transformation, every component will have to be separately translated into ASCII keeping the basic delimiters (dot ., slash /, at @, : etc) unchanged and then each segment will be reassembled making the appropriate transformation.

Process 400 Assigns Tokens for each Punycode encoded email address string.

The system for scanning and converting Punycode text to Unicode text with augmented reality wherein the Unicode strings and components thereof are available separately or in combination for future processing through internal and external applications. Internal application could be previously installed applications associated with the type of the string, a default Web Browser Application, a default Email Client Application and/or A default FTP Client Application or default worksheet editor (like Microsoft Excel), while external application could be server base or web client of Email and File Transfer Protocol (FTP) client Services, or web based client as default worksheet editor (like MS Excel on Microsoft Office Online Office 365) or some directly attached SQL or Database Server making record of the translated data/components (such as Microsoft SQL Client or Server, My SQL Database).

Process 410 Segregates the components encoded email address (for example prefix used email-id, the current standard symbol "@" commonly known to denote as email address (standard protocol), suffix (that mean) sub-sub-domain, sub-domain, top level domain (TLD) and/or port(s) and IP addresses).

Process 420 Assigns Sub-Tokens to each segregated components of (every) Punycode encoded email address(es) and segregated in process 420.

Conversion Process 500 automatically converts all the Punycode encoded email address string(s) into U Labels and Unicode encoded email address string(s) component by component and tracking by token and sub-tokens.

After successful conversion of segregated components of Punycode into Unicode, Assembly Process 550 automatically reassemble all the component of (U Labels and) Unicode encoded email address string(s) and all the data and information is returned to the presentation layer of the system.

Presentation layer arranges to display the output view "Unicode encoded email address string(s)" on client device on the same image in process 786 corresponding to the each Punycode email addresses string notation as augmented reality.

In addition to this, the applicant(s) also claims here in that the present system also makes these 'Unicode encoded email address(es) and segregated components' available in combination and/or separately for further processing through other internal and/or external associated applications of the same device and/or directly attached computers device(s) and/or remotely connected computer devices in process 999.

EBCDIC is the Extended Binary Coded Decimal Interchange Code while ASCII is the American Standard Code for Information Interchange and these are two character encoding schemes; which are more commonly known by their respective acronyms, ASCII and EBCDIC. The main difference between the two is the number of bits that they use to represent each character. EBCDIC uses 8 bits per character while the original ASCII standard only used 7, due to concerns that using 8 bits for characters that can be represented with 7 is much less efficient. EBCDIC has further code pages known as EBCDIC 37, EBCDIC 500, UTF-EBCDIC and EBSDIC codes has also has been used to accommodate multilingual characters schemes.

While scanning textual elements from input source object (image/frame), one have to take care of that what could be the text elements related to the methods and system (Web Address, Email Address and FTP Address) and the above listed types may also include in the possible cases Punycode, EBCDIC, UTF-EBCDIC, ASCII Code, Unicode, alpha numeric character set, hyphen and symbols. Not all the symbols could become the part of the web addresses labels or email string or ftp strings but at least "@" is used in Email and FTP addresses.

And further information is available on following Wikipedia pages:
   http://en.wikipedia.org/wiki/EBCDIC,
   http://en.wikipedia.org/wiki/EBCDIC_037,
   http://en.wikipedia.org/wiki/EBCDIC_500,
   http://en.wikipedia.org/wiki/UTF-EBCDIC,
   http://www.differencebetween.net/technology/communication-technology/difference-between-ebcdic-and-ascii/#ixzz3OtXSufMb The system does not require human interaction to complete its processes that is why cycle of all the processes is performed in real-time environment and immediately response appears on the display screen with augmented reality representation.

The system provides easy, efficient and simple user interface for the ease of a common and global user, and may also be enhanced in its embodiments to support multilingual interface features (in native language of the user), as the output of the present invention is already belongs to Unicode (that mean multilingual encoding support).

In a still further embodiment of the invention, computer related systems (method/ systems/ apparatus including computer program products) operable to perform operations including some common functions.

For example, taking image(s) or snapshot(s) or photo(s) or frame(s) of video(s) 100 in a real time environment from any of the available source(s) of the apparatus or device, whereas the well-known available media or source(s) could be as input or as retrieval from internal or external, and accessible from remote source(s) and/or local source(s); including camera interface 110 and/or image scanning interface 120 and/or temporary Memory/Cache 130 and/or permanent memory storage 140 and/or or user input interface 150 and/or frame(s) of local or remote Video Stream 160.

As well as the disclosed system is activated, Input Listener 190 is also invoked and starts listening input from common input resource(s) 100.

If the real-time image is being viewed or taken from any interface such as from scanning interface or digitizer or camera interface, the auto-focus procedure may be initiated for device dependent functionality including adjustment to aperture, zoom, brightness, sharpness or resolution supporting to arrange properly focused real time image for better readability and accuracy and this operational support activity is interlinked with the input listener 190.

If any input is received to input listener 190, it is immediately reviewed by filtration inspector 195 for some standard parameters including input type(s), quality, visibility, plain or filled with objects and if the quality of input image does not meet minimum threshold, input is rejected and process input listener 190 is intimated, otherwise, if successfully passed, the input is forwarded to next process 200.

Standard threshold for Optical Character Recognition is 128 which is either increased or decreased automatically according to success ratio of the character matching in related table of data dictionaries or can be adjusted by the user. Optimal threshold values and success ratio also depends on the pre-printed material that is being scanned and/or the image taking capabilities, quality of the camera or scanning input device such as brightness, sharpness aperture time, backlight, background and foreground color as well the scanning dpi quality like 150 dpi, 300 dpi, 600 dpi and 16 bit, 32 bit and 64 bit scanner. In some cases where the characters are mix with each other, image segmentation process is arranged in an automatic adjusted by histogram threshold.

On Wikipedia the definition of "Thresholding (image processing)" is defined as:
   Thresholding is the simplest method of image segmentation. From a grayscale image, thresholding can be used to create binary images (Shapiro, et al. 2001:83) http://en.wikipedia.org/wiki/Thresholding_(image_processing)
   Also elaborated on url page:
   http://www.scantips.com/basics4e.html
   And further explained by Mehmet Sezgin in his document http://electronicimaging.spiedigitallibrary.org/article.aspx?articleid=1098183

A local copy of the image/snapshot/photo/frame is also saved internally for reference (and future use) in process 197.

Recognizing the characters through OCR 200, the textual elements recognizable as text conforming to, for instance, Punycode, ASCII codes and/or EBCDIC Codes or Unicode alpha numeric characters set(s), hyphen and symbol(s), these characters and/or textual elements may be related to different languages (multilingual text), however, as per the required scope concerning textual elements, the objective of 200 is to find and abstract those FTP addresses which are encoded in Punycode notation with increased performance and accuracy of the OCR results, the OCR functionality may be improved by limiting its scope to the dictionary tables 250 that only relates to Punycode, EBCDIC and ASCII Code alpha numeric characters set(s) and symbol(s).

The optical character recognizer 200 converts the optical images of characters into encoded data by recognizing the characters in the character string information and generating a corresponding encoded data alpha numeric characters and symbols for each recognized character, textual elements/ manuscript. In one embodiment, the character recognizer is embodied as optical character recognition (OCR) software. OCR software is well known in the field and a detailed description of OCR software is beyond the scope of this disclosure and not necessary for the understanding of the subject invention. However, it should be understood that, in general, OCR software functions to convert bitmap image data corresponding to a document having text into encoded data corresponding to the text by using, for instance, a thresholding technique on the bitmap data.

Once at least one (or more) Punycode encoded ftp Address(es) is (/are) found in Punycode String with FTP Protocols Detection process 300, the disclosed system performs main processing that includes:

Process 400 Assigns Tokens for each Punycode encoded ftp address string.

Punycode strings labels are some mapping arrangements of non-ASCII code or Unicode domain names. Punycode is being used for Internationalized Domain Names (IDN), whereas the Internationalized Domain Names (IDN) may consist of non-ASCII characters according to the language table. A complete FTP string (command) may also include a user name, password, host name (web address or IP address), and other components, whereas few of them are ASCII Codes. Punycode FTP strings labels segment and IDN domain name is delimited by dots. Dots also segregate the Top Level Domain Name, Second Level domain name, Third Level Domain Name and/or sub domain name, and ftp string may further segregated by "@" symbol.

In the disclosed invention it is stated that the Punycode FTP string is assigned a token, this token will be used to refer (address) the complete Punycode FTP strings labels and will also help in pointing to the more than one Punycode strings labels separately. In the next step components of each Punycode FTP string labels are segregated in to separate components and each component is assigned with a sub token (a branch of the token), and each segregated component is processed through conversion processes to convert into ASCII Code, now these ASCII Code components has to be re-joined in the same sequence in which these were segregated. Sub Tokens will be helping in re-joining process. And then the converted string will also be related with the main Token.

For example in case of FTP Address command, that may include; prefix protocol File Transfer Protocol (ftp:// or sftp://), user name/id, ftp server password, sub-sub-domain, sub-domain, top level domain (TLD) and/or IP addresses (IPv4 or IPv6) and suffix ftp related port(s) (e.g. 21 or 23) and automatically converts all of the Punycode notation components/ elements into Unicode notation and reassemble these Unicode converted components and arrange to displays the output on the same image corresponding to the each Punycode string notation.

In some cases all of the components are required separately to be listed in a worksheet using some associated application to be used in further processing.

Process 410 Segregates the components encoded ftp address (for example prefix protocol (like ftp:// or ftps:// or sftp://), sub-sub-domain, sub-domain, top level domain (TLD) and/or IP addresses (IPv4 or IPv6) and suffix ftp related port(s) (e.g. port 21 or port 23)), in some of the embodiments, the components may also have user id and password (to be used for connectivity and access privileges to related ftp server), and in some of the embodiments credentials also denoted with the ftp server address such as (UserID@FTPServerAddress.TLD).

Process 420 Assigns Sub-Tokens to each segregated components of (every) Punycode encoded ftp address(es) and segregated in process 420.

Conversion Process 500 automatically converts all the Punycode encoded ftp address string(s) into U Labels and Unicode encoded ftp address string(s) component by component and tracking by token and sub-tokens.

U-label (https://www.icann.org/resources/pages/glossary-2014-02-04-en#u)

U Label=Unicode Label: The Unicode representation of an internationalized domain name, i.e. how it is shown to the end-user. Contrast with A-label.

Unicode:

Unicode is a commonly used single encoding scheme that provides a unique number for each character across a wide variety of languages and scripts. The Unicode standard contains tables that list the "code points" (unique numbers) for each local character identified. These tables continue to expand as more and more characters are digitalized.

In Unicode, characters are assigned codes that uniquely define every character in many of the scripts in the world. These "code points" are unique numbers for a character or some character aspect such as an accent mark or ligature. Unicode supports more than a million code points, which are written with a "U" followed by a plus sign and the unique number in hexadecimal notation; for example, the word "Hello" is written U+0048 U+0065 U+006C U+006C U+006F.

After successful conversion of segregated components of Punycode into Unicode, Assembly Process 550 automatically reassemble all the component of (U Labels and) Unicode encoded ftp address string(s) and all the data and information is returned to the presentation layer of the system.

Presentation layer arranges to display the output view "Unicode encoded ftp address string(s)" on client device on the same image in process 786 corresponding to the each Punycode ftp addresses string notation as augmented reality.

In addition to this, the applicant(s) also claims here in that the present system also makes these 'Unicode encoded ftp/ sftp/ ftps address(es) and segregated components' available in combination and/or separately for further processing through other internal and/or external associated applications of the same device and/or directly attached computers device(s) and/or remotely connected computer devices in process 999.

The system does not require human interaction to complete its processes that is why cycle of all the processes is performed in real-time environment and immediately response appears on the display screen with augmented reality representation.

The system provides easy, efficient and simple user interface for the ease of a common and global user, and may also be enhanced in its embodiments to support multilingual interface features (in native language of the user), as the output of the present invention is already belongs to Unicode (that mean multilingual encoding support).

While the invention has been described in connection with its preferred embodiments, it should be recognized that changes and modifications may be made therein without departing from the scope of the appended claims.

What is claimed is:

1. A method for converting Punycode text to Unicode text and displaying with augmented reality, said method comprising:
   providing a client device, a computer, a scanner, optical code recognition software, Punycode/ASCII and/or Unicode dictionary tables, and Punycode text;
   taking an image of said Punycode text and saving said image in said computer;
   scanning and saving said image of said Punycode text in said computer;
   subjecting said scanned image to said optical code recognition software to identify Punycode strings;
   converting and segregating said Punycode strings to Unicode strings; and
   displaying said Unicode strings in Unicode and/or ASCII code alpha numeric character sets; and
   wherein the optical character recognizer converts the optical image of characters into decoded data by recognizing the characters in the character string and generating a corresponding decoded data alpha numeric characters and symbols for each recognized character.

2. The method converting Punycode text to Unicode text and displaying with augmented reality according to claim 1, in which tokens and sub tokens are assigned to each Punycode string and segregated components.

3. The method converting Punycode text to Unicode text and displaying with augmented reality according to claim 1, in which the conversion process converts Punycode strings and segregated components to Unicode strings.

4. The method converting Punycode text to Unicode text and displaying with augmented reality according to claim 1, in which sub-subdomain, subdomain, top level domain, sub-folder, and page address, page extensions, keywords and parameters are then reassembled.

5. The method converting Punycode text to Unicode text and displaying with augmented reality according to claim 1, in which a display of the same image corresponding to each Punycode string as augmented reality and makes the components available in combination and separately for further processing.

6. The method converting Punycode text to Unicode text and displaying with augmented reality according to claim 1, in which the Unicode strings are displayed on the client device as augmented reality.

7. The method converting Punycode text to Unicode text and displaying with augmented reality according to claim 1, in which the Unicode strings and components are available in combination and separately for further processing through internal and external applications of the same device and with directly attached computer or remotely connected computer devices.

8. A system for scanning and converting Punycode email addresses to Unicode with augmented reality, said system comprising:
a client device, a computer, a scanner, an optical code recognizer including optical code recognition software, Punycode/ASCII and/or Unicode dictionary table, and Punycode text;
said system scanning and saving an image of said Punycode text in said computer and displaying on said client device;
wherein said image is scanned and subjected to said optical code recognizer to identify Punycode strings and converted and segregated Unicode strings; and
said Unicode strings displayed on said client device adjacent said image of said Punycode strings; and
wherein said optical character recognizer converts the optical image by recognizing and segregating Unicode data in a character string and generating a display corresponding to a described character string in alpha numeric characters and symbols adjacent said image on said client device.

9. The system for scanning and converting Punycode text to Unicode text with augmented reality according to claim 8, which includes an input detector.

10. The system for scanning and converting Punycode text to Unicode text with augmented reality according to claim 8, in which tokens and sub tokens are assigned to each Punycode strings and segregated component.

11. The system for scanning and converting Punycode text to Unicode text with augmented reality according to claim 8, in which the conversion converts Punycode strings and segregated components to Unicode strings.

12. The system for scanning and converting Punycode text to Unicode text with augmented reality according to claim 8, in which sub-subdomain, subdomain, top level domain, sub-folder, page address, page extension, keyword and parameters are reassembled.

13. The system for scanning and converting Punycode text to Unicode text with augmented reality according to claim 8, in which each of said Unicode strings are displayed on said client's device adjacent said image of said Punycode string displayed on that same device.

14. The system for scanning and converting Punycode text to Unicode text with augmented reality according to claim 8, in which said Unicode strings are displayed on said client's device as augmented reality adjacent an image of said Punycode strings.

15. The system for scanning and converting Punycode text to Unicode text with augmented reality according to claim 8, in which the Unicode strings and components thereof are available separately or in combination for future processing through internal and external applications.

16. A method for converting file transfer protocol addresses encoded in Punycode notations from simple or congested textual elements, and Punycode FTP addresses into Unicode FTP addresses and displaying them on an image corresponding to related text elements as augmented reality, said method comprising:
providing a client device including a computer, a scanner, optical code recognizer including optical code recognition software, Punycode/ASCII and/or Unicode dictionary tables, and Punycode text;
forming an image of said Punycode text with said scanner and said software;
providing an input detection device and detecting said image of said Punycode text in real time;
providing a filtration inspection and inputting said image for standard parameters including input types and if the quality of an image fails to meet a minimum threshold rejecting said image of said input types;
recognizing characters by optical code recognition and optical code recognition software wherein textual elements are recognizable as text conforming to Punycode, EBCDIC code, ASCII code, Unicode, alpha numeric character sets, hyphen and symbols to find and abstract FTP addresses which are encoded in Punycode;
converting optical images of characters into encoded data by said optical code recognizer by recognizing the characters in a character string of information and generating a corresponding encoded data in alpha numeric characters and symbols for each recognized character; and
displaying on the client device.

17. A method for converting file transfer protocol addresses encoded in Punycode notations from simple or congested textual elements, and Punycode FTP addresses into Unicode FTP addresses and displaying them on an image corresponding to related text elements as augmented reality according to claim 16, in which the optical code recognizer's functionality is improved by limiting its scope to said dictionary tables that relate only to Punycode, EBCDIC code, Unicode and ASCII code alpha numeric character set(s) and symbol(s).

18. A method for converting file transfer protocol addresses encoded in Punycode notations from simple or congested textual elements, and Punycode FTP addresses into Unicode FTP addresses and displaying them on an image corresponding to related text elements as augmented reality according to claim 16, in which said optical code recognition software functions to convert bitmap image data corresponding to a document having text included in encoded data by using a thresh holding technique on the bitmap data.

19. A method for converting file transfer protocol addresses encoded in Punycode notations from simple or congested textual elements, and Punycode FTP addresses into Unicode FTP addresses and displaying them on an image corresponding to related text elements as augmented reality according to claim 16, in which one Punycode encoded FTP address is found performing the following:
- assigning tokens for each Punycode encoded FTP address string segregating the component encoded FTP addresses;
- assigning sub-tokens to each segregated component of every Punycode encoded FTP address;
- converting all the Punycode encoded FTP address strings into Unicode encoded FTP address strings into U-labels and Unicode encoded FTP address strings by component and tracking by token and sub-tokens; and
- after conversion of segregated components into Unicode reassemble the component of Unicode encoded FTP address strings and all the data is displayed on a client's device.

20. A method for converting file transfer protocol addresses encoded in Punycode notations from textual elements and Punycode FTP addresses and displaying them on an image corresponding to related text elements as augmented reality, said method consisting of:
- providing a client device including a computer, a scanner, optical code recognizer including optical code recognition software, Punycode/ASCII and/or Unicode dictionary tables, and Punycode text;
- forming an image of said Punycode text with said scanner and said software;
- providing an input detection device and detecting said image of said Punycode text in real time;
- providing a filtration inspection and inputting said image for standard parameters including input types and if the quality of an image fails to meet a minimum threshold rejecting said image of said input types;
- recognizing characters by optical code recognition and optical code recognition software wherein textual elements are recognizable as text conforming to Punycode, EBCDIC code, ASCII code, Unicode, alpha numeric character sets, hyphen and symbols to find and abstract FTP addresses which are encoded in Punycode;
- converting optical images of characters into encoded data by said optical code recognizer by recognizing the characters in a character string of information and generating a corresponding encoded data in alpha numeric characters and symbols for each recognized character; and
- displaying on the client device.

21. The method for converting file transfer protocol addresses encoded in Punycode notations from textual elements and Punycode FTP addresses and displaying them on an image corresponding to related text elements as augmented reality according to claim 20, and further making the Unicode encoded FTP addresses and segregated components available separately and in combination for further processing.

22. The method converting Punycode text to Unicode text and displaying with augmented reality according to claim 1, in which includes displaying said Unicode string including the email address, web address and FTP address in Unicode and/or ASCII code alphanumeric character sets.

* * * * *